United States Patent [19]
Chang

[11] Patent Number: 5,772,882
[45] Date of Patent: Jun. 30, 1998

[54] ANTI-CLOGGING DEVICE FOR DRAIN PIPE IN BUILDING CONSTRUCTION

[76] Inventor: Yi-Chun Chang, P. O. Box 55-846, Taipei, Taiwan

[21] Appl. No.: 859,121

[22] Filed: May 20, 1997

[51] Int. Cl.⁶ .................................................. B01D 35/02
[52] U.S. Cl. .......................... 210/460; 210/474; 210/477; 210/497; 210/497.01; 52/16
[58] Field of Search .................................. 52/11, 12, 16, 52/94, 95, 302; 210/469, 474, 477, 460, 464, 497.01

[56] References Cited

U.S. PATENT DOCUMENTS

| 2,013,761 | 9/1935 | Murphy | 210/170 |
|---|---|---|---|
| 2,701,644 | 2/1955 | Griffiths | 210/159 |
| 4,268,390 | 5/1981 | Cunningham | 210/464 |
| 4,798,028 | 1/1989 | Pinion | 52/16 |
| 5,575,925 | 11/1996 | Logue, Jr. | 210/445 |

Primary Examiner—W. L. Walker

[57] ABSTRACT

An anti-clogging device for drain pipe includes: a cap member linked with an open-topped cylindrical container, whereby upon insertion of the cylindrical container into the drain pipe and upon covering of the cap member on a top opening of the drain pipe, the drain pipe can be well protected for preventing clogging by waste materials or scraps in a building construction site by means of the anti-clogging device.

5 Claims, 4 Drawing Sheets

ANTI-CLOGGING DEVICE FOR DRAIN PIPE IN BUILDING CONSTRUCTION

BACKGROUND OF THE INVENTION

A conventional drain pipe P as shown in FIG. 1 may be prefixed in a concrete floor during the construction of building. In order to prevent from clogging of the drain pipe by dirts, gravel or scraps in the construction site, a top opening of the drain pipe may be first sealed by welding, soldering or melting S on the plastic pipe during the construction, which however should be further severed along an upper cutting line C of the pipe P after finishing the construction of the building concrete floor, thereby increasing construction inconvenience and building cost.

The present inventor has found these drawbacks and invented the present anti-clogging device for drain pipe in building construction.

SUMMARY OF THE INVENTION

The object of the present invention is to provide an anti-clogging device for drain pipe including: a cap member linked with an open-topped cylindrical container, whereby upon insertion of the cylindrical container into the drain pipe and upon covering of the cap member on a top opening of the drain pipe, the drain pipe can be well protected for preventing clogging by waste materials or scraps in a building construction site by means of the anti-clogging device.

DETAILED DESCRIPTION

Figure 1:
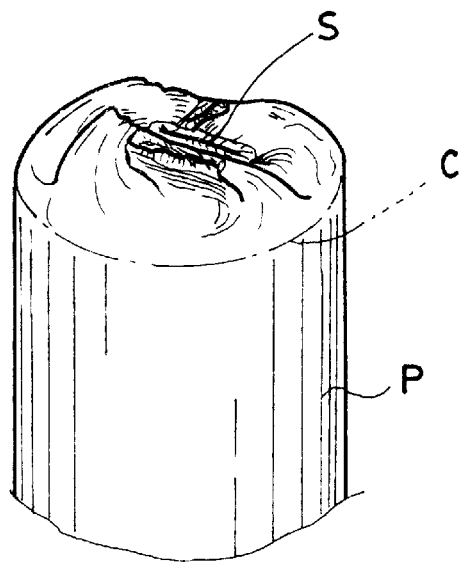
FIG. 1 is an illustration showing a conventional drain pipe.
Figure 2:
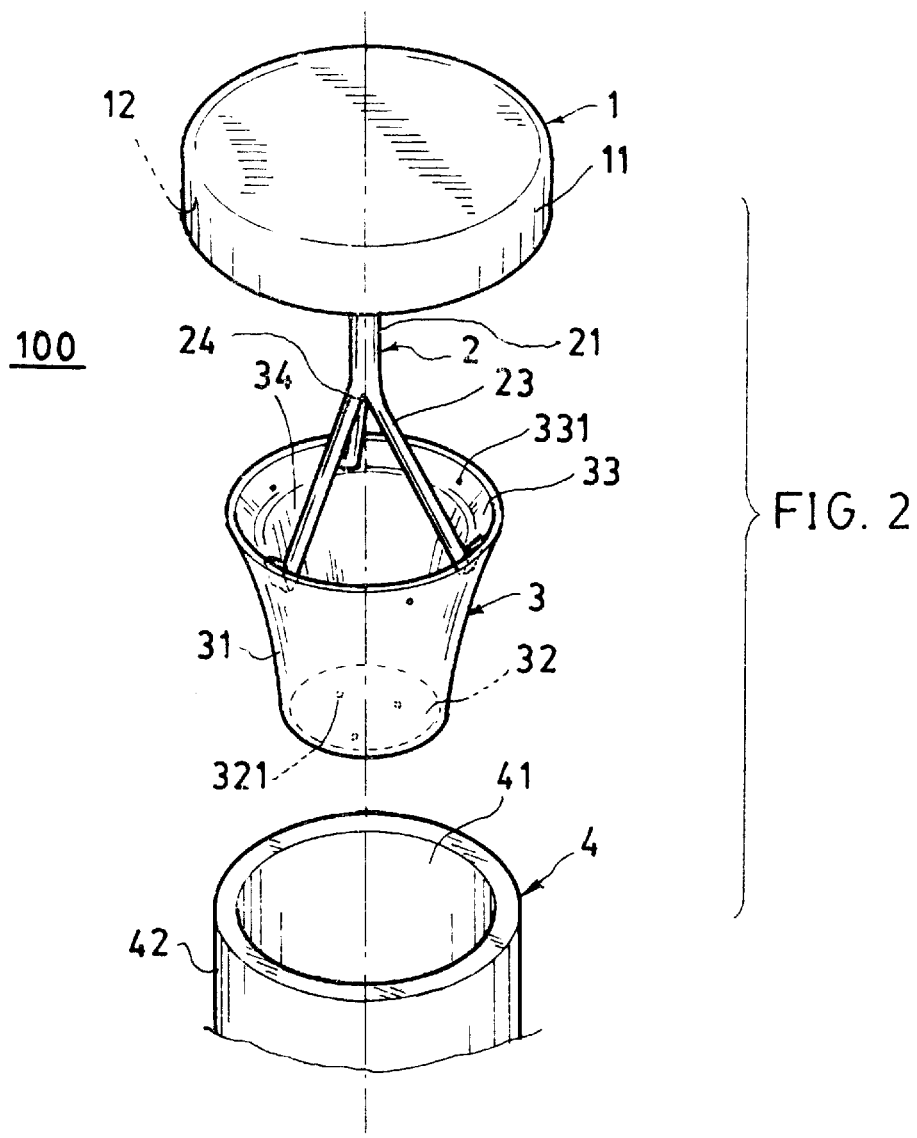
FIG. 2 is a perspective view of the present invention for capping a drain pipe.
Figure 3:
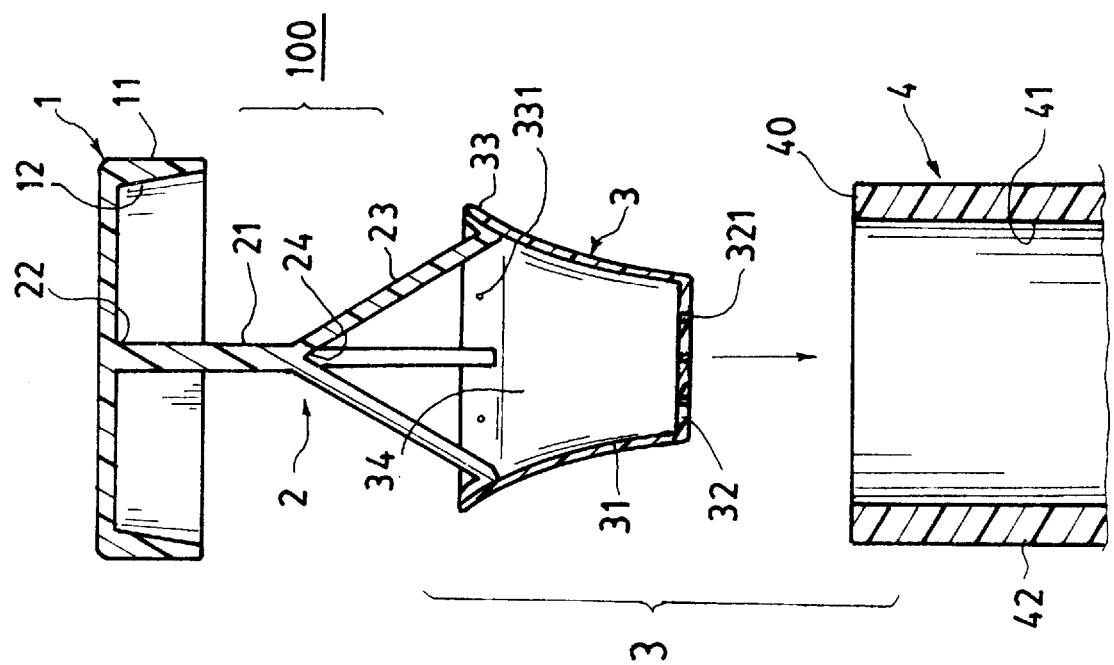
FIG. 3 is a sectional drawing of the present invention for capping the drain pipe.
Figure 4:
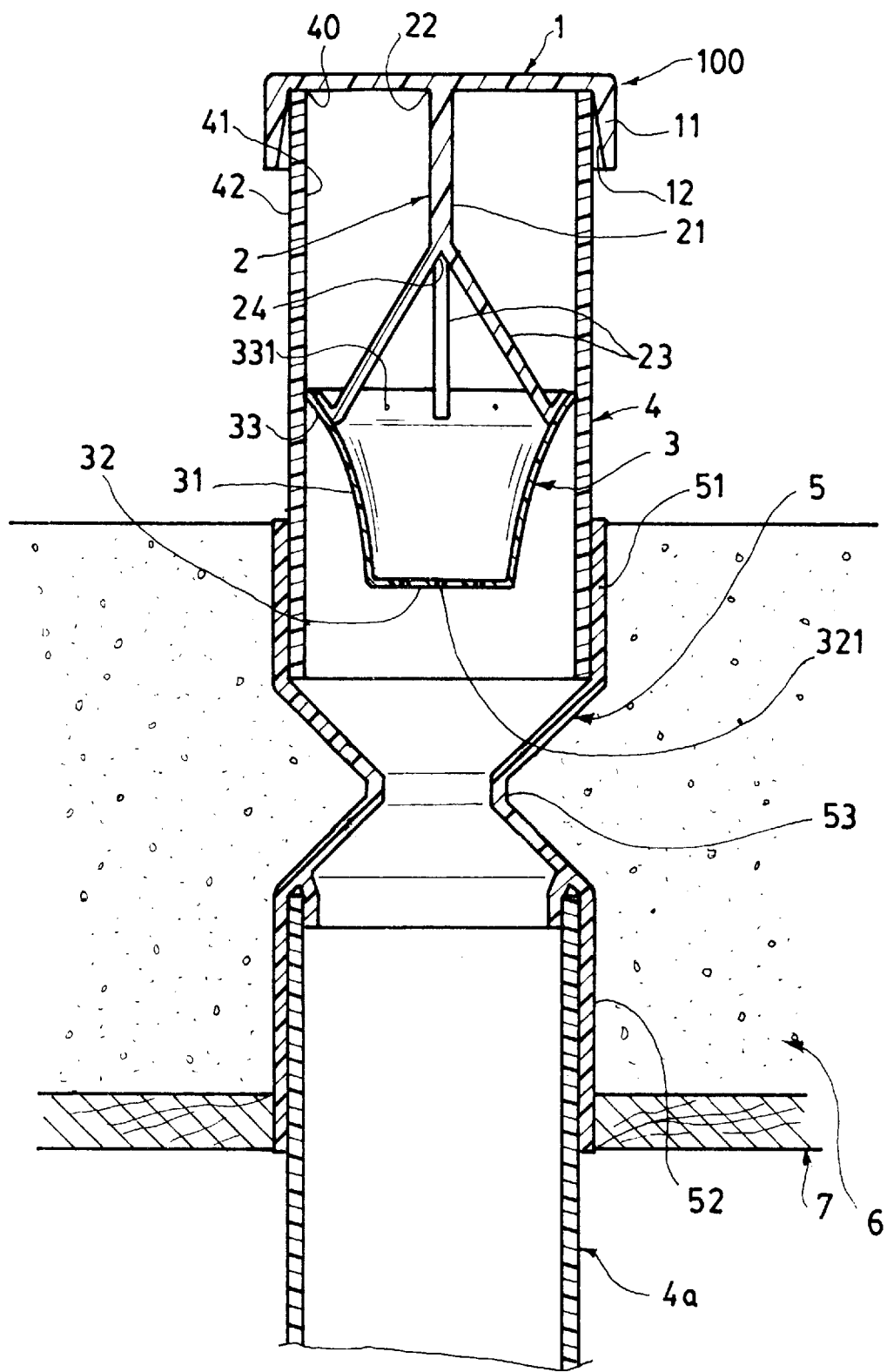
FIG. 4 is a sectional drawing of the present invention when capped on a drain pipe fixed in a concrete floor.

As shown in FIGS. 2–4, a preferred embodiment of the anti-clogging device 100 of a building drain pipe in accordance with the present invention comprises: a cap member 1 adapted for covering a top end portion 40 of a drain pipe 4 installed in a building concrete floor 6, a hanging connector 2 protruding downwardly from the cap member 1, and a bucket 3 secured to the hanging connector 2 to be hung under the cap member 1.

The cap member 1 includes: a cylindrical flange 11 circumferentially disposed around the cap member 1 having an inside cylindrical surface 12 slightly tapered downwardly for engaging a top end portion 40 of the drain pipe 4.

The drain pipe 4 is connectable to a lower drain pipe 4a by a coupling joint 5 pre-fixed in the concrete floor 6 curing in a shuttering 7 during the contruction of a building.

The coupling joint 5 has an upper sleeve 51 for connecting the drain pipe 4, and a lower sleeve 52 connected with the upper sleeve 51 by a middle contracted neck portion 53, with the lower sleeve 52 connected with the lower drain pipe 4a.

The hanging connector 2 includes: a link 21 having an upper link portion 22 secured to the cap member 1, and a plurality of hanging members 23 branched from a lower portion of the link 21 for connecting the bucket 3, having a staple portion 24 formed between the link 2 and the hanging members 23. The hanging members 23 may be trifurcated or bifurcated from the link 21, but not limited in the present invention.

The bucket 3 includes: an open-topped cylindrical container 31 having a bottom 32 formed on a bottom portion of the container 31, a flare portion 33 diverging upwardly outwardly from the container 31 to confine a top opening 34 within the flare portion 33 and the container 31, with the flare portion 33 secured to the hanging members 23 of the hanging connector 2.

The bottom 32 and the flare portion 33 are respectively drilled or formed with a plurality of perforations 321, 331 for draining any water flowing through the bucket 3.

The outside diameter of the flare portion 33 of the bucket 3 is equal to or slightly larger than an inside diameter 41 of the drain pipe 4 for a sealable insertion of the bucket 3 within the drain pipe 4.

Figure 5:
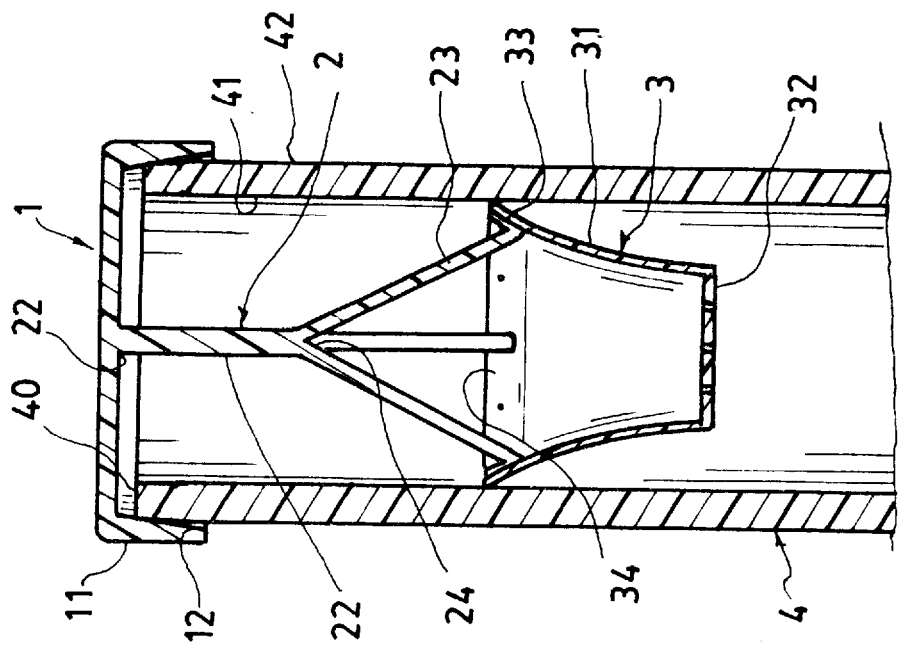
FIG. 5 shows another sectional drawing of the present invention when capped on a drain pipe.

The inside diameter of the cap member 1 is preferably equal to an outside diameter 42 of the drain pipe 4. The cylindrical inside surface 12 is slightly tapered downwardly as shown in FIG. 5 for an adjustable capping of the cap member 1 on the top end 40 of the drain pipe 4 allowing suitable tolerance due to slight differences of the pipe sizes.

When using the present invention, the cap member 1 is covered on the top end of the drain pipe 4 and the bucket 3 is inserted into the inside diameter 41 of the drain pipe 4, thereby preventing from incidental filling of waste materials into the drain pipe 4 during the construction of a reinforcing concrete floor 6.

Figure 6:
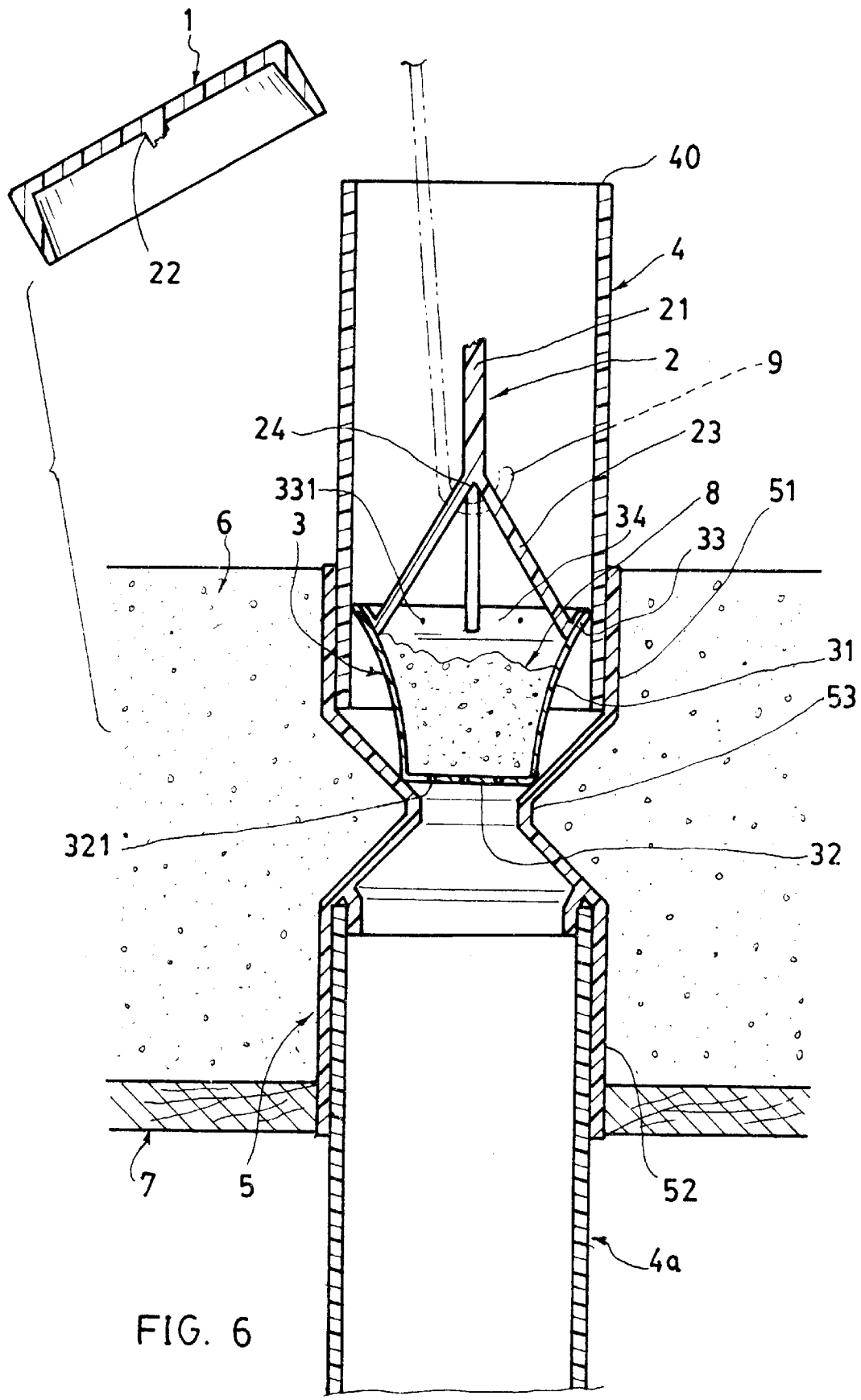
FIG. 6 is an illustration showing the anti-clogging function of the present invention.

If the cap member 1 is broken or separated from the link 21 of the present invention as shown in FIG. 6, the bucket 3 will be gravitationally dropped into a lower portion of the drain pipe 4 to be stopped and rested on the middle contracted portion 53 of the coupling joint 5. Any waste materials 8 such as gravels, sand or scraps in a building construction site may then be filled into the drain pipe 4 to be collected or caught by the bucket 3 dropped in the drain pipe 4. Then a hook 9 may be provided to engage the staple portion 24 of the present invention in order to pick up the bucket 3 sinked in the drain pipe 4 to also remove the waste materials 8 carried or loaded in the bucket 3, thereby preventing from clogging of the drain pipe 4. After finishing the construction of the building, the bucket 3 loaded with waste materials therein may be raised and removed from the drain pipe for maintaining a clear, well drained pipe to prevent from clogging therefore. Then the drain pipe 4 may be connected with other drain pipes for completing a drainage piping system for finishing the building construction.

The present invention may be made by any plastic molding process. The elements 1,2,3 for forming the anti-clogging device 100 of the present invention may be integrally formed during the manufacturing process or may be assembled or joined from the separated elements 1,2,3, not limited in the present invention.

The present invention may be modified without departing from the spirit and scope of this invention.

I claim:

1. An anti-clogging device for drain pipe in building construction comprising:

a cap member adapted for covering a top end portion of a drain pipe fixed in a building concrete floor, said cap member including: a cylindrical flange circumferentially disposed around the cap member having an inside diameter of said flange generally equal to an outside diameter of the drain pipe; and said cylindrical flange of said cap member slightly tapered downwardly to be adjustably fixed on the drain pipe;

a hanging connector protruding downwardly from said cap member, said hanging connector including: a link having an upper link portion secured to the cap member, and a plurality of hanging members branched from a lower portion of the link for connecting a bucket, having a staple portion formed between the link and the hanging members; and said bucket insertable into an inside diameter of the drain pipe, whereby upon breaking and removal of the cap member from said hanging connector, said bucket will be gravitationally rested in the drain pipe to collect waste materials filled into the drain pipe and will be removed from the drain pipe to prevent clogging of the drain pipe during the building construction.

2. An anti-clogging device according to claim 1, wherein said bucket includes an open-topped cylindrical container having a bottom formed on a bottom portion of the container, a flare portion diverging upwardly outwardly from the container to confine a top opening within the flare portion and the container, with the flare portion secured to the hanging members of the hanging connector.

3. An anti-clogging device according to claim 2, wherein said bucket is formed with a plurality of perforations therein for draining water flowing through the bucket.

4. An anti-clogging device according to claim 2, wherein said flare portion of said bucket has an outside diameter slightly larger than an inside diameter of the drain pipe for a sealable insertion of said bucket in said drain pipe.

5. An anti-clogging device according to claim 1, wherein said hanging members are trifurcated from the link.

\* \* \* \* \*